United States Patent [19]

Skillman

[11] 4,390,010
[45] Jun. 28, 1983

[54] SOLAR ENERGY COLLECTING APPARATUS AND ROLL-FORMED METAL BUILDING

[76] Inventor: Dale N. Skillman, P.O. Box 1311, Rapid City, S. Dak. 57709

[21] Appl. No.: 243,264

[22] Filed: Mar. 12, 1981

[51] Int. Cl.³ .............................................. F24J 3/02
[52] U.S. Cl. .................................. 126/450; 126/448; 126/431; 126/444
[58] Field of Search ............... 126/450, 432, 417, 448, 126/431, 444; 52/398, 400, 460, 462, 465, 469, 470, 399, 397

[56] References Cited

U.S. PATENT DOCUMENTS

| | | | |
|---|---|---|---|
| 4,094,301 | 6/1978 | Sorenson et al. | 126/450 |
| 4,098,260 | 7/1978 | Goettl | 126/422 |
| 4,129,177 | 12/1978 | Adcock | 165/485 |
| 4,249,517 | 2/1981 | Schroeder | 52/400 |
| 4,271,818 | 6/1981 | Hastwell | 126/450 |
| 4,308,858 | 1/1982 | Skillman | 126/450 |

Primary Examiner—James C. Yeung
Attorney, Agent, or Firm—Ancel W. Lewis, Jr.

[57] ABSTRACT

Solar energy collecting apparatus (21) includes a one-piece collector panel (25) having a flat collector plate (27) with an absorber surface (28) provided by an intermediate wall portion of the collector panel. The collector plate forms both a weather membrane over and a part of an airflow passage (26) with support structure having a channel-shaped exterior surface. The collector panel has upper side edge flanges (31, 32) for connecting adjacent edges together along a continuous seam structure and to the support structure so that the collector panel is an integral part of the support structure. A cover assembly includes an outer sheet (51) and an inner sheet (52) with an air space (53) therebetween, together with side edge connecting members (57) that hold the sheets apart and attach to the seam structure formed by connected collector panels. Each side edge connecting member has an upper slot (58) that receives the upper sheet and is held by a locking strip (64) and a lower slot (67) on an incline so that the lower sheet has an edge portion wrapped around a welt (58) that slides into slot (67) in a friction-fitting relationship.

14 Claims, 9 Drawing Figures

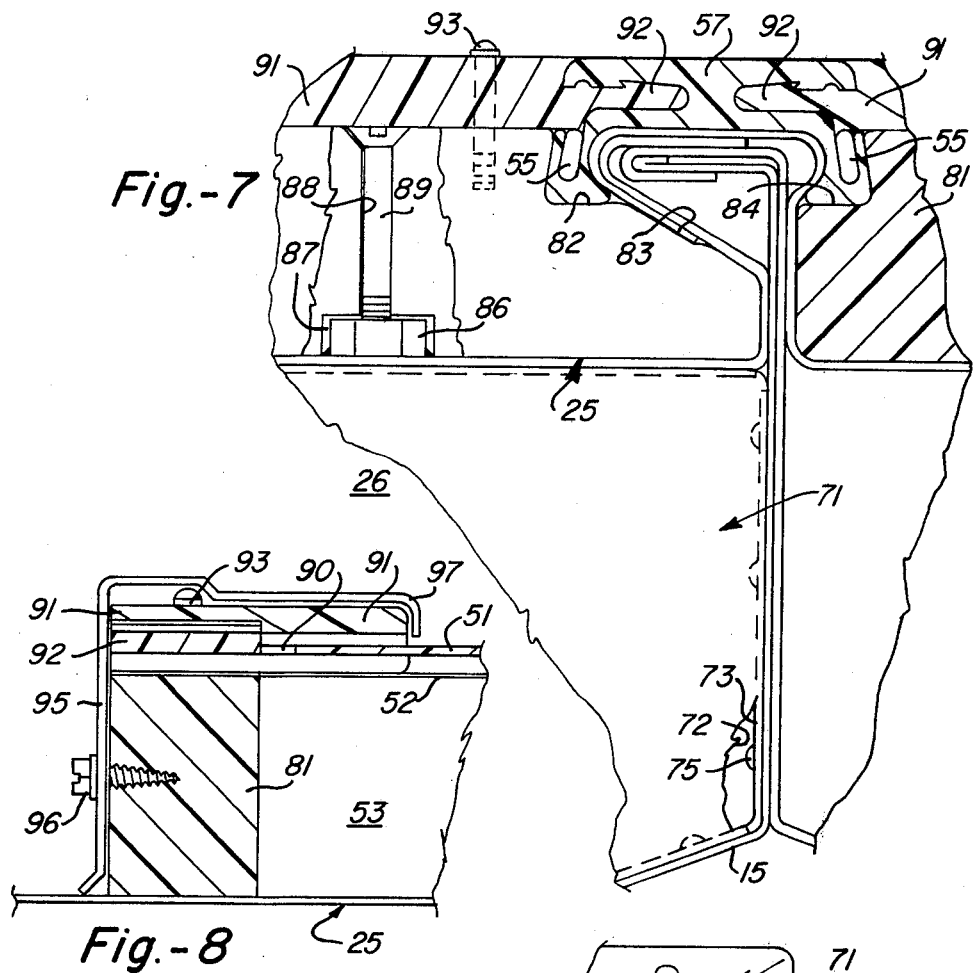
Fig.-7
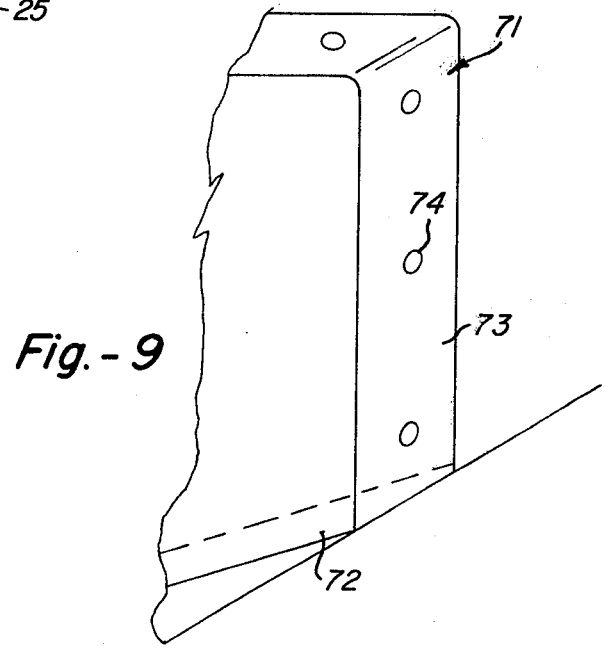
Fig.-8
Fig.-9

SOLAR ENERGY COLLECTING APPARATUS AND ROLL-FORMED METAL BUILDING

TECHNICAL FIELD

This invention relates to novel and improved solar energy collecting apparatus that is particularly suited for use in combination with roll-formed metal building structures and the like and is particularly suited for being made by on-site portable roll-forming apparatus.

BACKGROUND ART

Roll-formed metal buildings as described in U.S. Pat. Nos. 2,842,647, 3,902,288, 3,967,430, and 4,120,123 have been found to be particularly useful in a variety of industrial, commercial, agricultural and institutional applications. A significant advantage of roll-formed metal buildings is that the cost can be substantially reduced by decentralized manufacturing using portable roll-forming apparatus.

In an earlier filed application Ser. No. 89,100 filed Oct. 29, 1979, now U.S. Pat. No. 4,308,858 there is disclosed solar energy collecting apparatus for use on new or existing conventional flat-roof buildings wherein the solar collector also serves as a weather membrane to reduce costs and increase structural strength. The solar energy collecting apparatus of the present invention has the advantage of using decentralized roll-forming apparatus and is structurally integrated into the above referred to building to make this building, and similar structure having a U-shaped exterior profile, solar active.

DISCLOSURE OF INVENTION

The solar energy collecting apparatus disclosed is constructed and connected as an integral part of a support structure having exterior channel shapes arranged side by side, wherein the exterior surface of the structure forms the bottom portion of an airflow passage for the removal of heat produced from the solar collector plate and wherein the collector plate is made as a part of a channel-shaped collector panel, particularly suited for being roll-formed from coiled sheet stock, that nests in the support structure and forms a weather membrane. The solar energy collecting assembly is mounted on each channel-shaped support structure and includes the collector plate provided by an intermediate bottom portion having an absorber surface.

The collector panel further has opposed sidewall portions and upper side edge portions that connect with adjacent upper side edge portions to join the collector panels side by side along a continuous seam structure. In a support structure such as an arched building in which a curved building panel forms the roof and sides, a plurality of the solar energy collecting assemblies cover a selected portion of the arched building. End closures close the ends of the airflow passage, air space above the collector plate, and between cover sheets. A supply manifold supplies air to one end and a discharge manifold removes heated air from the opposite end of each airflow passage.

BRIEF DESCRIPTION OF DRAWINGS

The details of this invention will be described in connection with the accompanying drawings, in which:

FIG. 7 is an end view showing the end closures with external portions broken away to show interior construction;

FIG. 8 is a side elevation view of the two upper end closures shown in FIG. 7; and FIG. 9 is a fragmentary perspective view of an end closure for the air flow passage.

DETAILED DESCRIPTION

Figure 1:
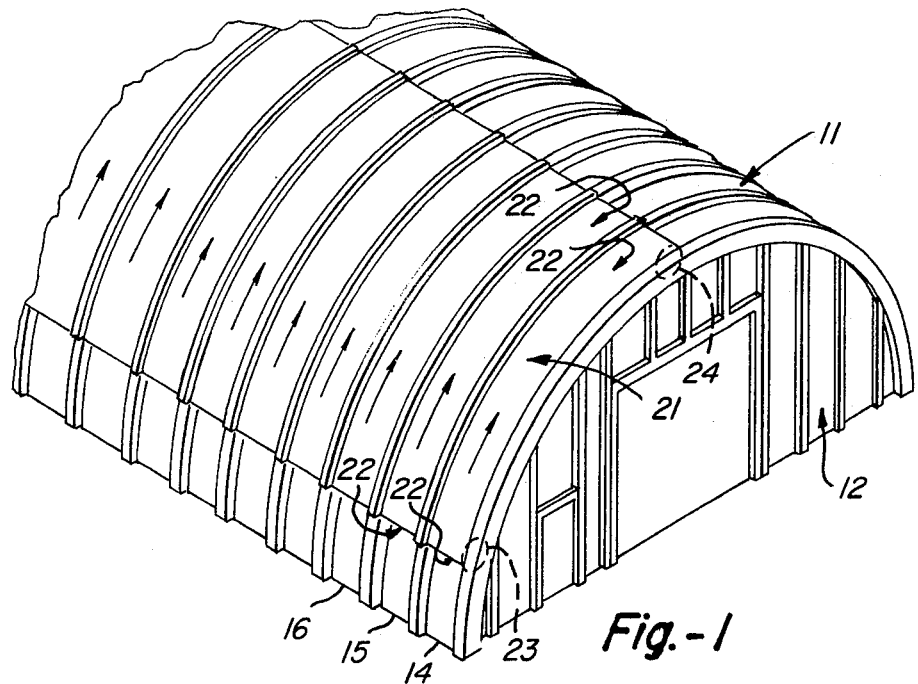
FIG. 1 is a top perspective view of solar energy collecting apparatus mounted on a portion of an arched metal building, embodying features of the present invention.
Figure 2:
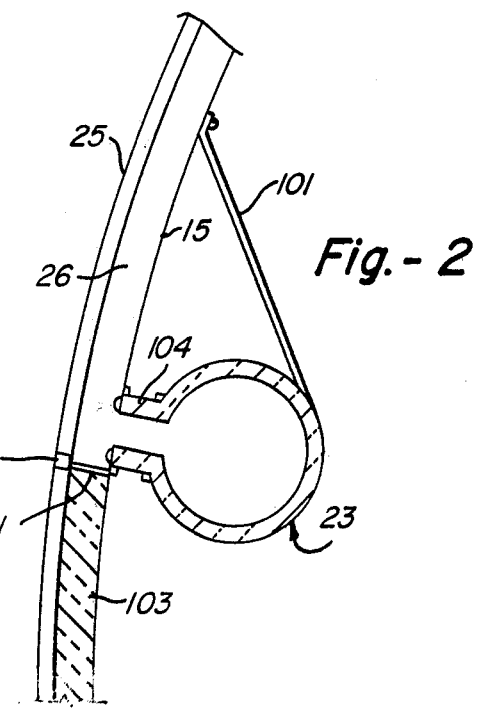
FIG. 2 is a sectional view showing the inlet manifold for forcing air through each of the solar energy collecting assemblies.
Figure 3:
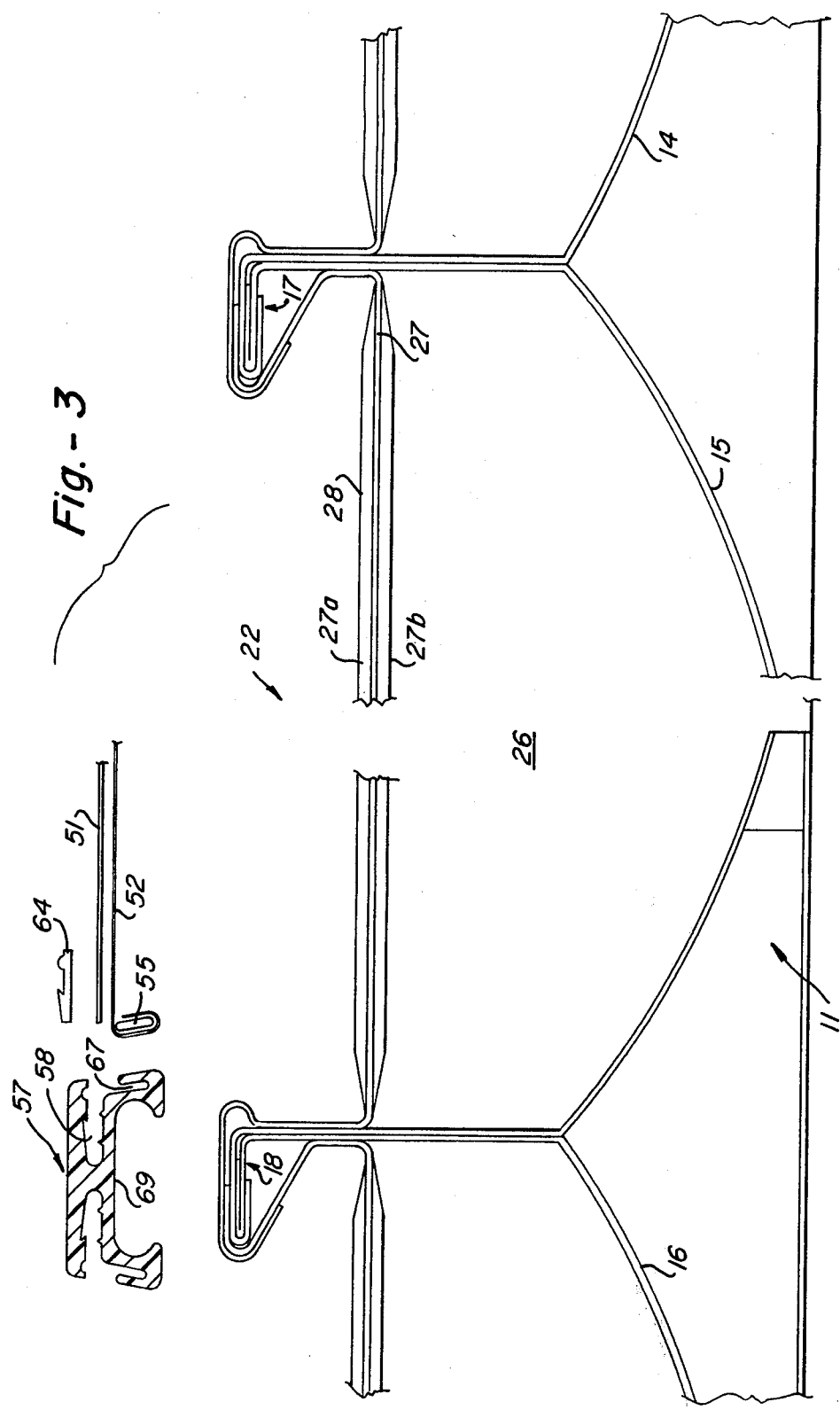
FIG. 3 is a transverse cross-sectional view through the apparatus shown in FIG. 1 with the cover and side edge connecting member removed and shown above in an unassembled condition.

Referring now to the drawings, the solar energy collecting apparatus 21 shown in FIG. 1 is mounted on an arched building of the type disclosed in U.S. Pat. No. 4,120,123. This building has a longitudinally curved or arched structure 11 having a semicircular extent that forms both the top and opposed sides of the building and the building has an end wall structure 12 that closes the ends thereof.

The arched structure 11 comprises a plurality of similarly shaped, curved, channel-shaped members or building panels referred to by numerals 14, 15 and 16 connected side by side at two longitudinally continuous seam structures 17 and 18 extending along opposite side edges of panel 15. The end wall structure 12 is made up of a plurality of connected building panels that differ only in that they are straight rather than curved. Arched structure 11 therefore provides support structure having a channel-shaped exterior profile.

A portion of the curved structure forming the roof and one side of the building is made solar active by the solar energy collecting apparatus 21, which spans slightly less than one-half a semicircle beginning a selected distance above the bottom of the semicircular arc and ending slightly past the apex or center of the arc so that rain will drain down the back side of the building. The length and position of the apparatus 21 are determined by the latitude of the building location and the application of the heat collected, i.e., summer or winter demand.

The solar energy collecting apparatus 21 is comprised of a plurality of identical solar energy collecting assemblies 22 arranged side by side along the building, each having an inlet at the bottom which is supplied air by a common inlet manifold 23 and an outlet at the top that feeds to a common outlet manifold 24, the air flowing upwardly along the solar energy collecting assemblies in the direction indicated by arrows.

Each solar energy collecting assembly 22 is made by mounting a unitary, channel-shaped, collector panel 25 in a support structure having a channel-shaped exterior profile. For the purpose of illustration, the construction of the collector panel 25 is essentially the same as the cap 24 described in U.S. Pat. No. 4,120,123. The collector panel 25 is in the form of an elongated, longitudinally continuous, one-piece, sheet metal body which includes the flat collector plate 27 with an absorber surface 28 provided by the intermediate or bottom wall portion of the formed panel. The absorber surface 28 is provided by precoating the sheet metal with a selective solar absorber finish that absorbs the energy from the sun and heats up. The collector plate 27 traverses the exterior top face of the supporting structure, and specifically the building panel, in spaced relation thereto to also form the upper portion of an airflow passage 26, whereby heat is removed from the collector plate 27.

Figure 5:
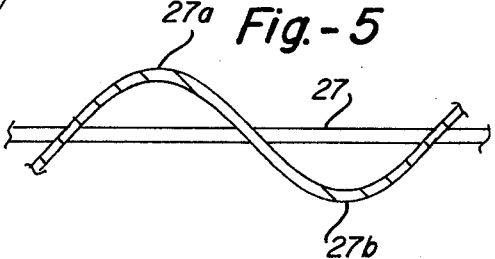
FIG. 5 is an enlarged cross-sectional segment of the collector plate of FIG. 1.

The collector panel 21 further has side edge portions 31 and 32 along opposite marginal edges of the collector plate 27. More specifically, side edge portion 28 has an intermediate, inverted, channel-shaped section 34, a side section 35, and a terminal fastening section 36, and side edge portion 29 has a generally C-shaped section 41 and a side section 42. The collector plate 27 is formed with corrugations 27a and 27b that extend above and below the plane of the solar energy collecting panel 25, as further illustrated in FIG. 5.

A solar energy transmissive glazing assembly or cover includes an outer sheet 51 and an inner sheet 52 arranged parallel to one another with an air space 53 therebetween. The outer sheet 51 is a sheet of plastic film. The inner sheet 52 is a sheet of plastic film that has each side edge portion 52 looped around an elongated welt 55 that is coextensive with the length of the film. The welt 55 has a generally rectangular cross section with rounded corners at the top and bottom.

The outer sheet 51 is preferably a 0.040 Kalwall fiberglass sheet and the inner sheet 52 a Teflon film like that described in the above mentioned earlier filed application. This cover reduces radiative and convective losses from the collector plate, thereby improving the efficiency of the collector. The welt 55 is preferably made of a Teflon film material.

Side edge connecting members 57 are in the form of an attachment channel and are provided for supporting and fastening the side edges of the cover sheets 51 and 52 to the connected solar energy panels. These side edge connecting members are symmetrical about a vertical median line to provide the same structural arrangement on both sides of the vertical median line.

Figure 4:
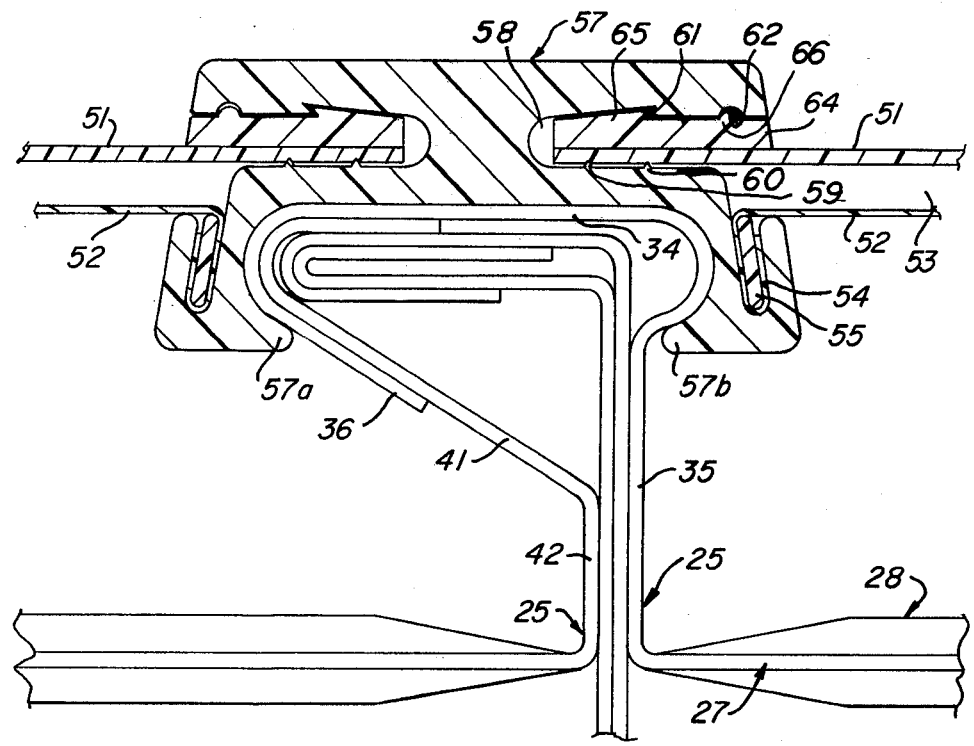
FIG. 4 is a transverse cross-sectional view of two collector panels connected side by side with the cover in place.

Referring now to the right side as seen in FIG. 4, the side edge connecting member 57 has a horizontal side slot or channel 58 opening in a side of the menber sized to slidably receive the outer sheet 51, together with raised gripping edges 59 and 60 on a top inside face and a gripping edge 61 and a recess 62 on the bottom inside face. A locking strip 64 is provided that inserts into the side channel 58 and forces the outer sheet 51 down against the teeth 59 and 60 and has a raised edge 65 and a raised bead 66 that lock it in place in a wedging engagement with the outer sheet to retain the outer sheet fastened in a taut condition to one side of the side edge connecting member 51 and form a weathertight joint.

The side edge connecting member 51 further includes an inwardly and downwardly inclined chanel 67 opening along the side sized to receive the welt 55 and a looped portion 54 wrapped thereon such that they slide therein in a close friction-fitting relationship and form a weathertight joint. The side edge connecting member also has a downfacing C-shaped bottom recess 69 provided by inturned end portions 57a and 57b arranged to snap-fit onto the interlocking seam structure formed by the flanges on the collector panels 25 to to secure the cover sheets to the solar collector panels.

The side edge connecting member 57, welt 55, and locking strip 64 preferably are all extruded non-metallic profiles having good heat insulation qualities. The connecting member 57 provides a thermal break between the top of the building panels at their connecting joints and the environment to reduce heat loss to the environment.

An end cap 71 is used at each end of the airflow passage 26 as a means for closing the opposite ends of the airflow passage 26. A preferred construction for this end cap 71 is an end wall portion 72 having the same shape as the airflow passage and an inturned flange 73 along all sides provided with apertures 74 through which fasteners 75 such as rivets may extend to fasten the end cap to the sides of the building panel. A suitable manner of fabricating the end cap is by stamping sheet metal.

Another end cap 81 is used at each end of the air space above the solar collector plate as a means at the ends of this air space 53 to provide a dead volume of air above the absorber surface 28. A preferred construction for end cap 81 is a solid block of molded foam plastic that has an end view profile complementary with that of a transverse cross section of the air space with an upper notch 82 at one end to slide under the side edge connecting member and a beveled edge 83 at the same end to slide under the inclined flanges connecting the solar energy collecting panels. At the opposite end an upper notch 84 slides under the bottom part of the side edge connecting member. As seen in FIG. 8, the end cap has a nominal width so as not to extend very far into the air space.

For fastening the end cap 81 in place, internally threaded anchor blocks 86 are affixed to to the solar energy collecting panel as by spot welding and the block is provided with a recess 87 and a bolt hole 88 whereby a bolt fastener 89 extends down through the bolt hole and secures the end cap in place. In a preferred construction three of these fasteners are used in each end cap 81.

An end cap 91 is used at each end of the space between the two cover sheets 51 and 52 having end portions 92 of about one-half the full length of cap 91, the end portions 92 being sized to fit into the recess 58 in the side edge connecting member to hold the welt and looped side edge portion of the inner sheet in place. Bolt fasteners 93 are shown extending down through an aperture in end cap 91 and into end cap 81 to hold cap 91 in place. A flashing strip 95 is shown extending over the end caps 91 and 81 and secured to the end cap 81 by a bolt fastener 96. The flashing strip 95 has a downturned end portion 97 extending over an inner corner of end cap 91.

Figure 6:
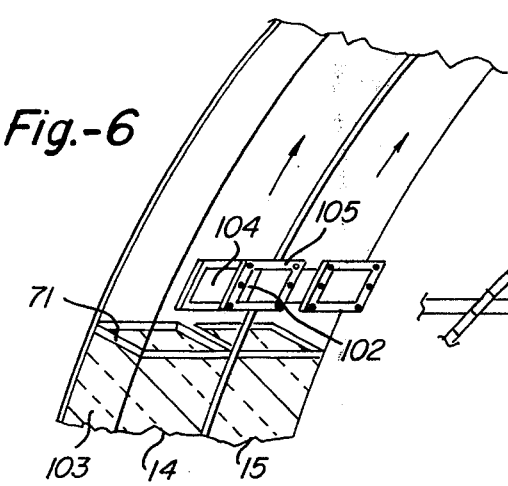
FIG. 6 is an enlarged fragmentary perspective view of a portion of FIG. 2 showing the airflow input duct mounting flange.

The supply manifold for supplying air to the airflow passages 26 is in the form of a cylindrical duct 23 made of heat insulation that extends the full length of the apparatus 21 at the bottom thereof and is shown as supported from a wall of the building panel by a strap 101. A bottom opening 102 is formed in the building panel, as seen in FIG. 6, and there are an end cap 71 and insulation 103 at the end of the building panel.

A sheet metal duct mounting 104 is mounted on the inside of the building panel and has a flange 105 with bolt holes so that the duct 23 mounts to the duct mounting 104. The return manifold 24 is an insulated return duct of the same construction as that of the supply manifold.

In the operation of the above described apparatus, the striking of sun rays on the absorber surface 28 causes the collector plate to become hot and transfers the heat to the underside by conduction. The air circulates from the bottom inlet to the top outlet through each assembly and the heat is transferred to this airflow by forced convection.

From the foregoing it is readily apparent that the principal element, which is the collector panel, is readily made by roll-forming sheet metal into the desired shape at the job site. The cover assembly is readily applied and removed if necessary. The collector plate portion of each panel forms a weather membrane over the support structure.

Although the present invention has been described with a certain degree of particularity, it is understood that the present disclosure has been made by way of example and that changes in details of structure may be made without departing from the spirit thereof.

What is claimed is:

1. In solar energy collecting apparatus, the combination comprising a solar energy collecting assembly including:
   a load supporting structure of a building in the form of a plurality of panels connected side by side at a seam joining means;
   a one-piece collector panel having a substantially flat collector plate with an absorber surface provided by an intermediate wall portion of the collector panel for collecting solar energy, said collector plate forming an imperforate weather membrane and forming an airflow passage above said supporting structure using said supporting structure to define a lower portion of said passage, said passage carrying air heated by said collector plate, said collector panel having upper side edge flanges for connecting together adjacent collector plates at continuous seam structure that is seamed to said seam joining means; and
   a solar energy transmissive cover mounted on the associated opposed sidewall portions above each collector plate to provide an air space between said cover and associated collector plate, each cover mounting including a side edge connecting member connected along each of the opposite side edges of each cover for fastening said opposite side edges of the cover to the sidewall portions of the associated collector panel at said upper side edge flanges to form an air space above each associated collector plate.

2. In apparatus as set forth in claim 1 wherein said cover includes outer and inner cover sheets spaced from one another by said side edge connecting member.

3. In apparatus as set forth in claim 2 wherein said side edge connecting member has a generally horizontally disposed side channel opening in a side into which the outer cover sheet slidably inserts and a locking strip which inserts into the side channel to hold the outer cover sheet to the side edge connecting member.

4. In apparatus as set forth in claim 2 wherein said side edge connecting member includes an inwardly and downwardly inclined side channel having a substantially uniform width from an entrance opening to the bottom thereof and opening in a side sized to receive a side edge portion of the second cover sheet wrapped on a welt of substantially the same size and shape as said inclined side channel to hold the inner cover sheet to the side edge connecting member, the cover sheet wrapped on the welt being freely slidable into and out of said side channel.

5. In apparatus as set forth in claim 1 wherein said side edge connecting member has a bottom portion shaped complementary to the seam structure joining adjacent collector plates to snap-fit onto said seam structure.

6. In apparatus as set forth in claim 1 wherein said collector panel is an integral load-supporting part of the supporting structure.

7. In apparatus as set forth in claim 1 wherein said supporting structure is in the form of a substantially semicircular arc made of a plurality of roll-formed metal building panels connected along adjacent side edges at adjacent seam structure.

8. In apparatus as set forth in claim 1 wherein said side edge connecting member is non-metallic to provide a thermal break between said metal building and said collector plate.

9. In apparatus as set forth in claim 1 wherein each collector panel nests within an associated U-shaped member and is connected along adjacent side edges to form a double-channel load-bearing structure.

10. In apparatus as set forth in claim 1 wherein said continuous seam structure connects to said supporting structure to connect said collector panels thereto.

11. In a solar energy collecting apparatus having a collector plate with an absorber surface for collecting solar energy, said collector plate forming an imperforate weather membrane and forming an airflow passage above the support structure, said collector plate having upper side edge flanges for connecting together adjacent collector plates at continuous seam structure,
   an improved cover adapted for mounting in spaced relation to said collector plate to provide an air space between said cover and collector plate, each cover mounting including a side edge connecting member connected along each of the opposite side edges of each cover for fastening said opposite side edges of the cover to the collector plate to form an air space above the collector plate,
   said cover including upper and lower sheets, each of a solar transmissive material and spaced from one another, said upper sheet being held in a first slot in the side of said connecting member by an edge strip, said lower sheet having an edge portion wrapped around a welt and inserted into a second slot in said connecting member arranged at a downward and inward incline to a vertical plane, said second slot being in the shape of a channel having a substantially uniform width from an entrance opening to the bottom thereof, said cover sheet wrapped on said welt being freely slidable into and out of said side channel.

12. In apparatus as set forth in claim 11 wherein said side edge connecting member and said edge strip are made of a non-metallic heat insulation material.

13. In solar energy collecting apparatus, the combination comprising:
   a load supporting structure of a building in the form of a plurality of exterior channel shapes connected side by side at a seam joining means;
   a one-piece collector panel associated with each channel shape having a substantially flat collector plate with an absorber surface provided by an intermediate wall portion of the collector panel for collecting solar energy, said collector plate forming an imperforate weather membrane and forming an airflow passage using said supporting structure to define a lower portion of said passage, said passage carrying air heated by said collector plate, said collector panel having opposed sidewall portions extending from opposite side edges of said intermediate wall portion, and upper side edge flanges for connecting together adjacent collector plates at continuous seam structure that is seamed to said seam joining means, said collector panel having first end closure means at the opposite ends of said airflow passage;

a solar energy transmissive cover mounted on the associated opposed sidewall portions above each collector plate to provide an air space between said cover and associated collector plate, each cover mounting including a side edge connecting member connected along each of the opposite side edges of each cover for fastening said opposite side edges of the cover to the sidewall portions of the associated collector panel at said upper side edge flanges to form an air space above each associated collector plate, each cover having a second closure means at the ends of said air space to provide a dead air space above the associated collector plate;

first manifold means for supplying air under pressure to one end of said airflow passage to move along said airflow passage and absorb heat from the associated collector plate; and second manifold means opposite said first manifold means to convey heated air away from said airflow passage.

14. In solar energy collecting apparatus, the combination comprising:

a load supporting structure of a building having a plurality of free-spanning, curved, metal, roll-formed building panels connected at upstanding continuous seam joining means along adjacent side edges;

a one-piece collector panel associated with each building panel having a substantially flat collector plate with an absorber surface provided by an intermediate wall portion of the collector panel for collecting solar energy, said collector plate forming an imperforate weather membrane and forming an airflow passage using said supporting structure to define a lower portion of said passage, said collector panel having opposed sidewall portions extending from opposite side edges of said intermediate wall portion and nested in intermediate walls of said building panel, and upper side edge flanges for integrally connecting together adjacent collector plates at continuous seam structure that is seamed to said seam joining means connecting said building panels, said collector panel having first end closure means at the opposite ends of said airflow passage;

a solar energy transmissive cover mounted on the associated opposed sidewall portions above each collector plate to provide an air space between said cover and associated collector plate, each cover mounting including a side edge connecting member connected along each of the opposite side edges of each cover for fastening said opposite side edges of the cover to the sidewall portions of the associated collector panel at said upper side edge flanges to form an air space above each associated collector plate, each cover having a second closure means at the ends of said air space to provide a dead air space above the associated collector plate;

first manifold means in the form of an insulated duct extending lengthwise of a bottom portion of the building for supplying air under pressure to one end of said airflow passage to move along said airflow passage and absorb heat from the associated collector plate; and second manifold means in the form of an insulated duct extending lengthwise of a top portion of the building opposite said first manifold means to convey heated air away from said airflow passage.

* * * * *